May 11, 1937. O. SCHUETZE 2,079,719
HAND TRUCK
Filed Nov. 2, 1935 3 Sheets-Sheet 2
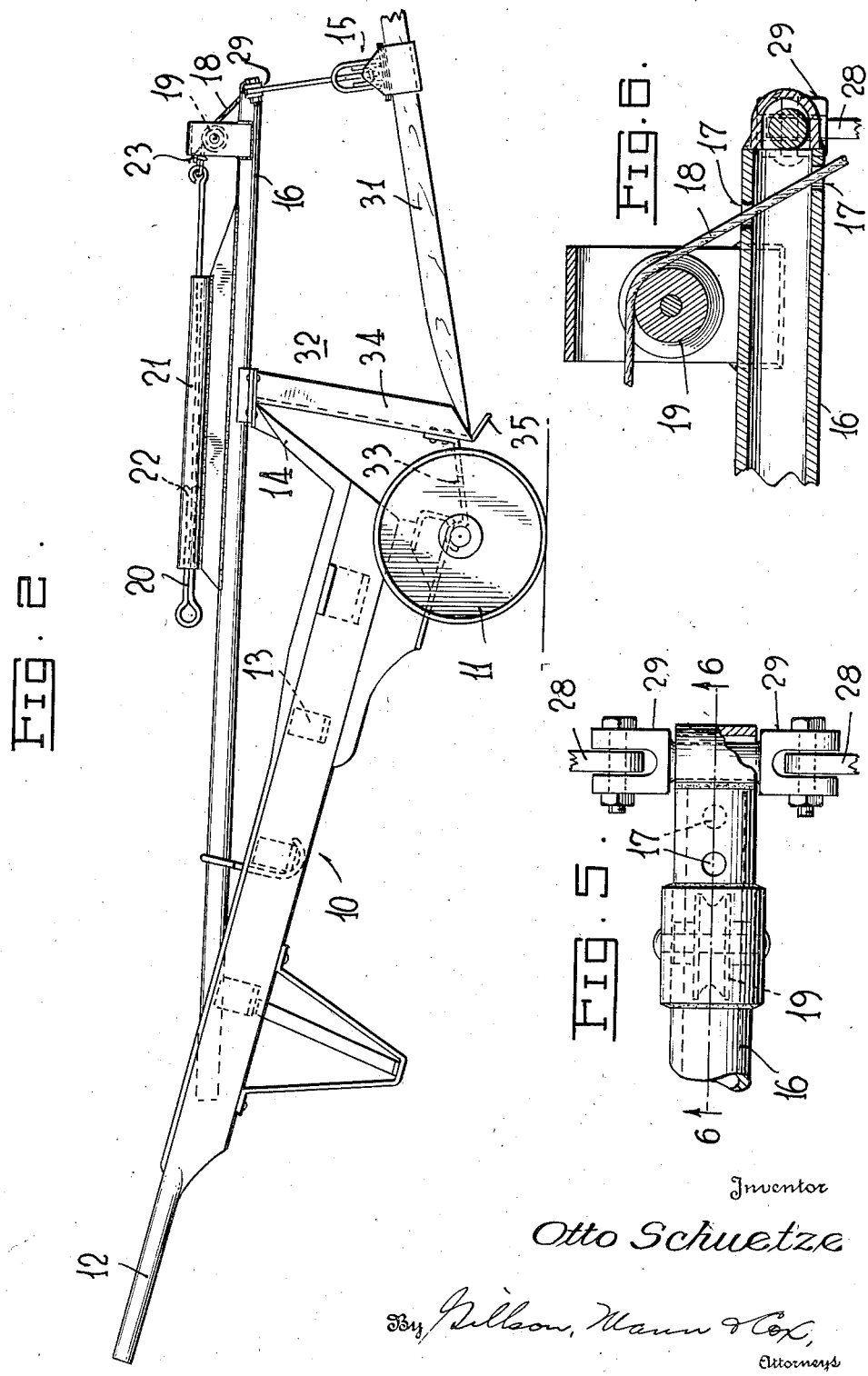
Inventor
Otto Schuetze

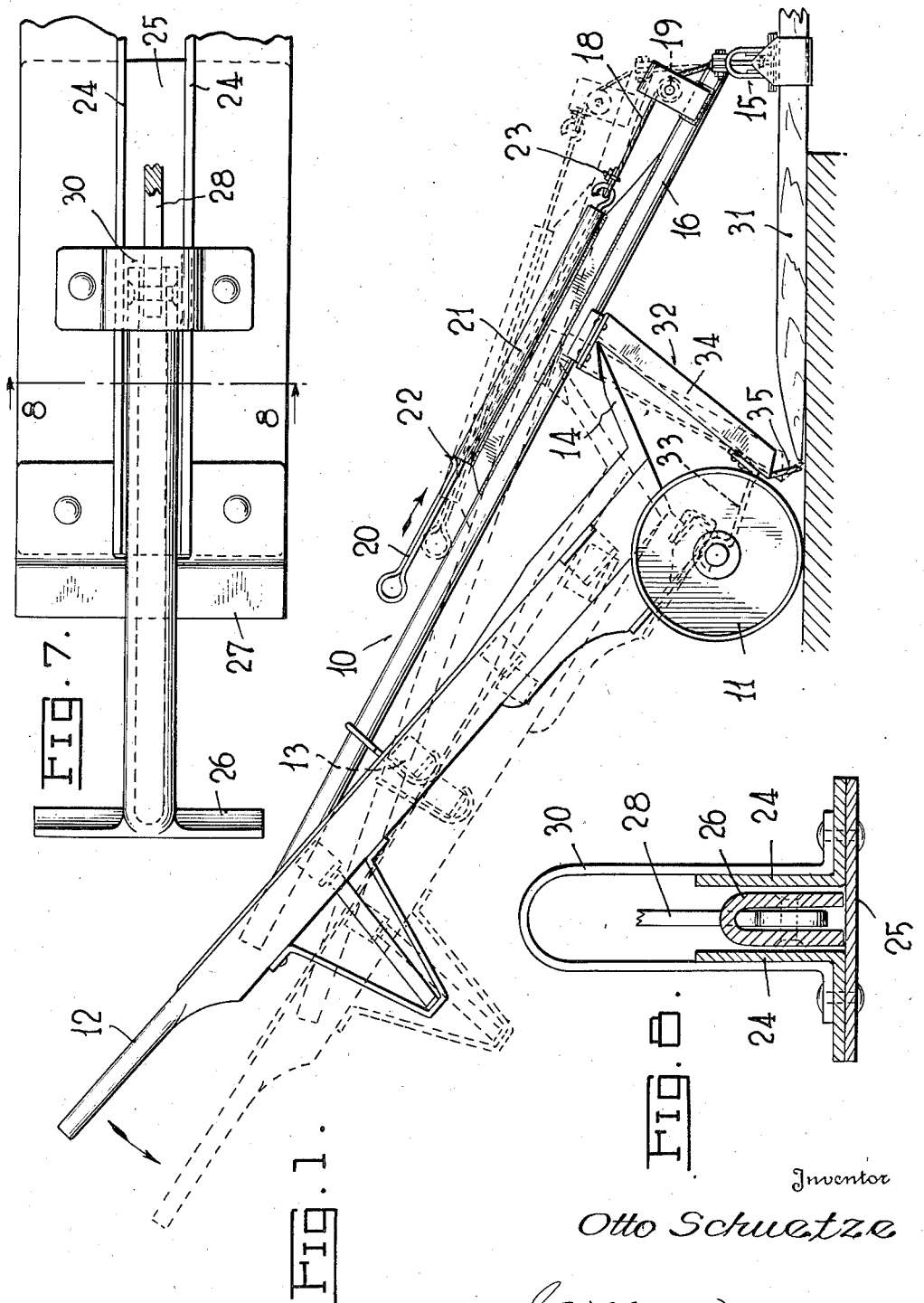

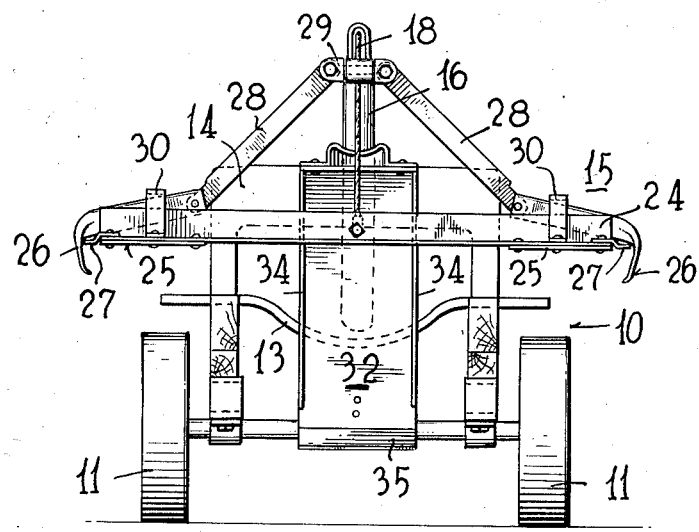
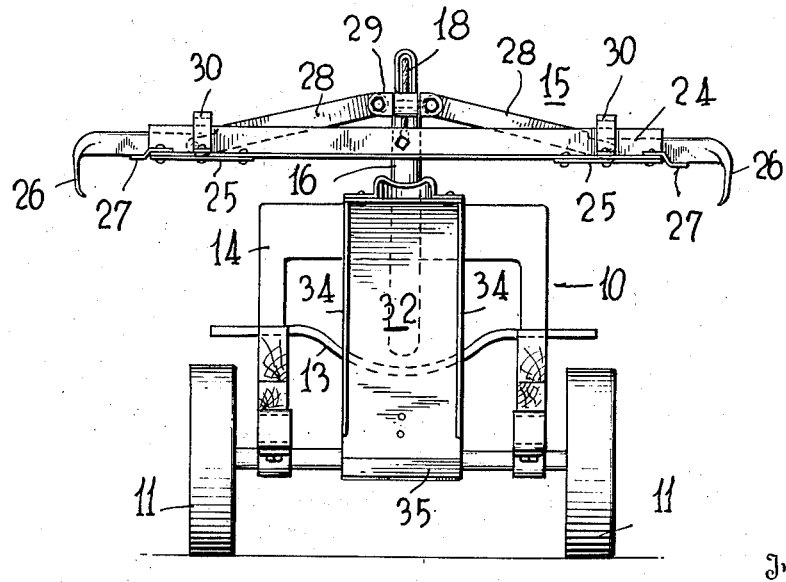

Patented May 11, 1937

2,079,719

UNITED STATES PATENT OFFICE 2,079,719

HAND TRUCK

Otto Schuetze, Tacoma, Wash.

Application November 2, 1935, Serial No. 48,013

15 Claims. (Cl. 214—65.5)

This invention relates to hand trucks, and has for its principal object to enable one workman to handle heavy and unwieldy objects ordinarily requiring the joint effort of several and involving a hazard of personal injury and property damage.

The instrument provided by the invention is particularly adapted to the handling of such objects as the gang-planks or running boards used at railroad freight terminals to bridge the space between the terminal platform and the floor of a freight car. These gang-planks are commonly wide, flat boards, or a group of such boards cleated together, and normal freight terminal operation generally requires that each day many gang-planks be set in place when the cars are opened and be picked up and moved when loading or unloading is completed, or the car doors are closed. The gang-planks are too heavy and cumbersome for quick and efficient manual handling by one man.

Instances of bruised fingers are common and occasionally more serious personal injuries are suffered. In addition, the life of the gang-planks is appreciably shortened by the wear resulting from their being dragged over the terminal floors and by the impact of their being dropped from upended transporting position to horizontal operative position.

Among the objects of the present invention is the providing of an instrumentality for the handling of gang-planks which will protect the operator from injury and the gang-plank from damage, which will lighten the labor of the operator and multiply his efficiency, which is of simple and rugged construction and foolproof in operation, which can be made at low first cost and maintained in operation at substantially no cost, and which, in one form of embodiment, can be made by a simple conversion of a standard type of warehouse truck.

Other objects and advantages will appear from the description hereinafter of a preferred embodiment of the invention.

An illustrative embodiment of the invention is shown by the drawings, in which—

Fig. 1 is a side elevational view of a truck embodying the invention, the truck being shown in full and broken lines to illustrate successive positions assumed during the operation of engaging a gang-plank;

Fig. 2 is a side elevational view of the truck in a further advanced position of operation, the gang-plank being shown lifted and supported by the truck and ready to be transported thereby;

Fig. 3 is a front end view of the truck with the load-engaging parts in load-engaged position;

Fig. 4 is a similar view with the load-engaging parts in position to receive a load;

Fig. 5 is a detail plan view of the forward end of the truck frame;

Fig. 6 is a longitudinal vertical sectional view taken along the line 6—6 of Fig. 5;

Fig. 7 is a detail plan view of one of the load-engaging elements and its mounting; and Fig. 8 is a vertical cross sectional view taken along the line 8—8 of Fig. 7.

But these drawings and the description thereof hereinafter are illustrative merely of a preferred embodiment of the invention. The principles of the invention are of wide application and capable of being otherwise embodied to suit the preference of the designer and the particular nature of the service required.

In the drawings 10 indicates the frame and 11 the wheels of a carriage which may be of a familiar type of warehouse truck as shown. Such trucks are well known and include side frame members terminating in handle portions 12 at the end opposite the wheels 11. The side members are connected by cross pieces 13, generally bowed or dished, as shown, and the wheeled end is provided with a blade 14. This conventional type of truck may be used as the carriage element of the truck contemplated by my invention, or the carriage may be specially built. It should, however, in any event include a frame and a ground wheel or wheels on which the frame can be fulcrumed as a lever.

I provide the carriage with a load-engaging device, designated as an entirety by the numeral 15, which is swung from the forward end of the frame, beyond the wheels. To position the point of suspension well beyond the wheels it is desirable to extend the frame of the kind of truck shown in the drawings by securing a boom or jib 16 to one or more of the cross pieces 13 and the blade 14. The projecting end of this extended frame is formed, as by openings 17, to provide a guide for a cable 18 which is sheaved over a pulley 19 bracketed on the frame. This cable carries the load-engaging device 15 at its forward end, and its rear end is fixed in a handle 20 which works in a guide 21 mounted on the frame. The load-engaging device may be raised and lowered with relation to the frame end by moving the handle 20 in its guide, and, to hold the device at either limit of its range of movement, stops may be provided, such for example as the catch 22 on the handle which may be engaged with the rear end of the handle guide 21 to hold the load-engaging device in its uppermost position and an enlargement 23 in the cable or handle which engages with the pulley and its bracket to hold the device 15 against further descent beyond a predetermined lowermost position, although, as will be shown hereinafter, such engagement preferably does not take place with the device supporting a load, so that the cable need not be relied on to support the load.

The load-engaging device 15 preferably comprises a grapple having hook elements which are extended into load-receiving position when the device is in raised position and are contracted into load-engaging position when the device is in lowered position. A convenient form of such device is shown in the drawings, where 24 indicates a cross member hung at its mid-point from the cable 18 and made up of two angle irons having two of their webs spaced apart in parallel planes by cleats 25 which are riveted or otherwise secured to the other two webs, which latter lie in a single plane. In each end of the cross member is mounted the blade-like shank of a hook 26 whose load-engaging end depends from the cross-member. The hooks 26, or more correctly their shanks, are free to move within limits longitudinally of the cross-member to be extended and retracted into load-receiving and load-engaging positions respectively. A bridge piece 27 may connect the angle iron elements of the cross-member to add strength to the assembly and limit the retraction of the hooks.

To extend and retract the hooks upon up and down movements of the cross-member in which they are mounted I provide a pair of links 28, each being pin-connected at one end to the inner end of a hook shank and similarly connected at its other end to a suitable clevis or the like 29 carried, preferably rotatably, by the end of the carriage frame extension 16. The manner in which this arrangement functions to extend and retract the hooks is evident from the drawings, particularly Figs. 3 and 4. U-shaped keepers 30 may be mounted on the cross-member 24 near its ends to cooperate with the bridge pieces 27 in providing bearings for the hooks when a load is carried thereby in the manner now to be explained.

In operation, the truck is pushed on its wheels up to an end of the gangplank or the like 31 to be lifted and moved. Handle 20 is pulled back and catch 22 engaged with the guide 21 to lift the load-engaging device 15 and spread the hooks 26 apart as shown in Fig. 4. The handles 12 of the frame are then elevated, the frame fulcruming about the wheels 11 to engage the cross-member 24 with the gangplank with the hooks projecting down over the sides thereof, all as shown in full lines in Fig. 1. Catch 22 is then released and handles 12 lowered. The weight of the load-engaging device 15 holds it on the gangplank as this movement of the frame, still acting as a lever fulcrumed on the wheels 11, proceeds, until the parts reach the relationship shown in Fig. 3, where the cross member and the load are supported from the double clevis by the links 28 and the hooks 26, all preferably before the enlargement 23 would engage the pulley to halt the paying out of the cable. When this point in the pivoting of the frame is reached the hooks have moved toward each other, in the cross-member 24, to grip the gangplank, the parts being then in the position shown in broken lines in Fig. 1.

Continued lowering of the frame handles 12 results in lifting the gangplank, which rides securely in the device 15, as shown in Fig. 2, and the truck may be pushed to move the lifted gangplank to a new location. During such movement the truck frame acts as a lever of the first class. The effort required by the embodiment shown is easily within the strength of a man. It may be further lightened, if desired, by providing extension handpieces such as lengths of pipe, not shown, for the handles 12.

The gangplank is deposited and released from the truck by the reverse of the described lifting operation. Gangplanks vary in length, and it is not practicable always to drop the cross-member 24 of the load-engaging device 15 directly over the center of gravity of the gangplanks, even when they are all of the same size and shape. Consequently, even in careful operation the lifted gangplank would seldom if ever balance fore and aft in a horizontal plane. Therefore, to prevent undesirable dragging of an end of the raised gangplank over the platform floor, and the even more objectionable bumping of the gangplank end against the truck wheels, I prefer to provide the truck with a gangplank end support and wheel fender 32 which may take the form of an apron fixed to the forward end of the truck frame, conveniently by direct connection of its upper edge with the truck blade and frame extension and by bracing means 33 supporting the lower end of the apron against the truck axle or other part. The apron may be made of heavy sheet metal or the like stiffened by forwardly extending vertical side edge flanges 34 and having its bottom edge flanged to provide an angularly forwardly extending blade 35. The flanges 34 are beveled off adjacent the blade 35 to provide what is virtually a channel or long notch extending across the whole width of the apron. As shown in Fig. 1 the truck is positioned for lifting with the blade 35 close to the end of the gangplank so that as soon as lifting begins that end will slip back and seat in the pocketing means formed by the notch or channel. Thus seated the gangplank is restrained by its own weight against rocking while the truck is being pushed from place to place.

I wish to emphasize the fact that the invention can be conveniently embodied by the illustrated simple conversion of a common type of known warehouse truck. I consider this aptitude of the invention a feature of importance, and I regard therefore those parts of the described embodiment which may be thought of as an attachment for an existing truck as comprising a complete, saleable entity which is novel and useful in itself and patentable without relation to the standard truck parts. I have therefore included in this application claims to certain sub-combinations of the whole operative embodiment. These claims may be regarded as defining and covering an attachment by which a truck already at hand may be converted into an instrument capable of rendering the type of service hereinabove explained.

Much of the structure of the illustrative embodiment hereinbefore described is matter of design only and as such it is to be distinguished from the essential functional relationships which characterize the broad invention as defined in certain of the appended claims. However, while such design features can be varied without destroying the identity of the essential invention, many of them are considered novel, useful and inventive per se, and as such they are made the subject of some of the more specific claims.

I claim:

1. In a wheeled lift truck a frame projecting beyond the wheel, a cross-member depending from a point on the projecting frame beyond the wheel, load-engaging hooks slidable in the ends of the cross-member, and means for moving said hooks toward each other in sliding engagement with the cross-member to engage a load.

2. In a wheeled lift truck a frame projecting beyond the wheel, a cross-member supported from the projecting frame, load-engaging hooks depending from the ends of the cross-member, and means for lowering the cross-member from the frame and simultaneously moving said hooks toward each other to engage a load.

3. In a wheeled lift truck a frame projecting beyond the wheel, a cross-member supported from the projecting frame, load-engaging hooks depending from the ends of the cross-member, means for moving the cross-member toward and away from the frame, and means connecting the hooks and the frame to spread the hooks when the cross-member is moved toward the frame and to move the hooks toward each other when the cross-member is moved away from the frame.

4. In a wheeled lift truck a frame projecting beyond the wheel, a cross-member, load-engaging hooks carried at the ends of the cross-member and movable relatively to the member, links pivoted to the hooks and the frame, and means suspending the member from the frame adapted to be adjusted to vary the distance between the frame and the member and the distance between the hooks.

5. In a wheeled lift truck a frame projecting beyond the wheel, links depending from the frame, a hook carried at the end of each link, a cross-member slidably mounting the hooks, and means for moving the cross-member toward and from the frame and thereby extending and retracting the hooks with relation to the cross-member.

6. In a wheeled lift truck a frame projecting beyond the wheel, a grappling head including elements movable to load-engaging and load-releasing positions, means connecting the frame and the head for moving the head to and from the frame, and other means connecting the frame and the head to cause said elements to move when said head is moved.

7. In a truck for handling freight car gangplanks and the like comprising a frame and a pair of axially aligned ground wheels carried thereby, means mounted at one end of the frame for engaging a gangplank and swinging the same from the frame, and a guard mounted on said end of the frame for receiving an end of the swung gangplank and preventing engagement thereof with said wheels, said guard having horizontal pocketing means to receive and steady the gangplank and restrain the received end thereof against movement relative to the truck.

8. In a truck for handling freight car gangplanks and the like comprising a frame and a pair of axially aligned ground wheels carried thereby, means mounted at one end of the frame for engaging a gangplank and swinging the same from the frame, and a guard mounted on said end of the frame and provided with an angularly extending blade adapted to be positioned close to an end of the gangplank to be swung and guide the same to engagement with said guard.

9. In a truck for handling freight car gangplanks and the like comprising a frame and a pair of axially aligned ground wheels carried thereby, means mounted at one end of the frame for engaging a gangplank and swinging the same from the frame, a guard mounted on said end of the frame having a portion formed to receive an end of the swung gangplank and steady the same against movement relative to the frame, and a blade extending from the guard adapted to be positioned close to an end of the gangplank to be swung and guide the same into engagement with said portion of the guard.

10. In a truck for handling freight car gangplanks and the like comprising a frame and a pair of axially aligned ground wheels carried between the ends of the frame and adapted to serve as a fulcrum upon which the frame may be swung as a lever of the first class, load-engaging means swung from one end of the frame including a pair of hooks and a cross-member mounting the same, links pivoted to the hooks and to the frame, and a flexible member for raising and lowering the cross-member relatively to the frame.

11. In a truck for handling freight car gangplanks and the like comprising a frame and a pair of axially aligned ground wheels carried between the ends of the frame and adapted to serve as a fulcrum upon which the frame may be swung as a lever of the first class, load-engaging means swung from one end of the frame including a pair of hooks and a cross-member mounting the same, links pivoted to the hooks and to the frame, and a flexible member for raising and lowering the cross-member relatively to the frame, the cross-member being adapted by its weight to remain in load-engagement while the frame is swung about its pivot and the hooks are moved toward each other in their mounting to engage the sides of the load.

12. For attachment to a hand truck, the combination of a truck frame extension member, a load-engaging device comprising a cross-member, hook elements mounted therein adapted to be spread to receive a load and moved toward each other to engage said load, and connections between the hooks and extension member constraining the hooks to be spread when the cross-member is moved toward the extension member and to be moved toward each other when the cross-member is moved away from the extension member, and means mounted on the frame extension member including a cable hanging the device therefrom.

13. For attachment to a hand truck provided with means for lifting freight car gangplanks and similar objects, means for gripping the side edges of the load, and a combined wheel fender and load support comprising a guard for protecting the truck wheels from being engaged by the load, said guard having a horizontal recess for receiving an end of the load to steady the same against vertical movement relative to the guard.

14. For attachment to a hand truck provided with means for lifting freight car gangplanks and similar objects, a combined wheel fender and load support comprising a guard for protecting the truck wheels from being engaged by the load, said guard having a projecting blade and an adjacent projecting part cooperating with the blade to form a pocket for receiving an end of the load to steady the same against movement relative to the guard.

15. For attachment to a hand truck provided with means for lifting freight car gangplanks and similar objects, a combined wheel fender and load support comprising a guard for protecting the truck wheels from being engaged by the load, said guard comprising a sheet metal body having its side margins bent forward to provide stiffening flanges and its lower margin bent forward to provide a load-receiving blade, the side flanges terminating short of the blade to form therewith a pocket for receiving an end of the load to steady the same against movement relative to the guard.

OTTO SCHUETZE.